United States Patent [19]

Rabinkin et al.

[11] Patent Number: 4,587,097

[45] Date of Patent: May 6, 1986

[54] HOMOGENEOUS LOW MELTING TEMPERATURE BRAZING FILLER METAL FOR JOINING FERROUS AND NON-FERROUS ALLOYS

[75] Inventors: Anatol Rabinkin, Morris Plains; Amitava Datta, Morris Township, Morris County, both of N.J.

[73] Assignee: Allied Corporation, Morris Township, Morris County, N.J.

[21] Appl. No.: 623,686

[22] Filed: Jun. 22, 1984

[51] Int. Cl.$^4$ .............................................. C22C 9/05
[52] U.S. Cl. .................... 420/473; 420/470; 420/476; 420/477; 420/482; 420/483; 420/489; 420/490; 420/493; 148/432; 148/433; 148/434; 428/606; 228/263.18; 75/251
[58] Field of Search ............ 420/470, 473, 476, 477, 420/482, 483, 489, 490, 493; 148/432–434, 411–413; 428/606; 228/263.18; 75/251

[56] References Cited

U.S. PATENT DOCUMENTS

| 2,355,067 | 8/1944 | Goldsmith | 420/483 |
| 4,071,358 | 1/1978 | Kawakatsu | 420/473 |
| 4,182,628 | 1/1980 | D'Silva | 420/497 |
| 4,416,853 | 11/1983 | Morikawa et al. | 420/490 |

FOREIGN PATENT DOCUMENTS

| 54-540 | 4/1980 | Japan | 420/490 |
| 1385191 | 2/1975 | United Kingdom | 420/477 |

*Primary Examiner*—Veronica O'Keefe
*Attorney, Agent, or Firm*—Ernest D. Buff; Gerhard H. Fuchs

[57] ABSTRACT

A metal alloy consisting essentially of about 4–16 atom percent manganese, 4–16 atom percent silicon, 0–16 atom percent tin, 0–20 atom percent zinc, 0–10 atom percent silver and about 0–10 atom percent indium, the balance being copper and incidental impurities. The alloy is adapted for brazing steels, cemented carbides to steels, copper and copper alloys to steels, copper to copper and copper alloys, and composite materials to steels and copper.

21 Claims, No Drawings

HOMOGENEOUS LOW MELTING TEMPERATURE BRAZING FILLER METAL FOR JOINING FERROUS AND NON-FERROUS ALLOYS

BACKGROUND OF INVENTION

1. Field of Invention

This invention relates to copper-base alloys and, more particularly, to homogeneous, ductile brazing filler metal alloys useful for joining steels, cemented carbides to steels, copper to steels, copper to copper and copper alloys, and composite materials to steels and copper.

2. Description of Prior Art

Three basic types of filler metals are conventionally used to join ferrous and non-ferrous alloys. According to specifications for brazing filler metals published in 1976 by the American Welding Society, these three major groups are classified as follows:

1. BAg classifications—Filler metals having this classification are used mainly for brazing carbon and low alloyed steel. These alloys have good wetting characteristics and braze steels well at relatively low temperatures, thereby minimizing grain growth in steel during brazing. These alloys do not contain phosphorus and, therefore, brazed joints exhibit good ductility because of the absence of brittle phosphides. However serious disadvantages exist in the applications; namely, they usually contain substantial amounts of toxic cadmium and precious silver.

2. BCu classifications—Filler metals having this classification are used mainly in furnace brazing in controlled atmospheres at temperatures exceeding 1000° C. (1850° F.). This group consists of alloys which have compositions with copper concentration exceeding 99%. Obviously these alloys cannot be used at low temperatures or under open atmospheric conditions.

3. RBCuZn classifications—Filler metals having this classification are used primarily at brazing temperatures exceeding 925° to 950° C. (1700° to 1740° F.). In ferrous brazing applications the major disadvantage of the last two classifications is a high brazing temperature. It is well known that such high temperature exposure causes austenite grain growth leading to the appearance of retained austenite which, in turn, results in increased warpage and other deleterious effects.

Attempts have been made to develop new alloy alternatives to the BAg alloys. These new alloy alternatives are based on a copper-manganese system which has a few low melting eutectic compositions. Modified copper-manganese alloys contain small amounts of various elements used as melting temperature depressants and/or strengthening agents.

British Pat. No. 996,177 published on June 23, 1965, describes a nickel-copper-manganese alloy containing small amounts of boron and germanium as temperature depressants in addition to iron and silicon. All alloys disclosed therein have melting temperatures well above 875° C. (1000° F.).

U.S. Pat. No. 4,071,538 describes a copper base brazing alloy containing manganese, nickel, tin and indium. The brazing temperature for this alloy is in the range of 1000°–1050° C. (1836°–1925° F.) which is much higher than temperatures acceptable for ferrous and copper brazing.

U.S. Pat. No. 4,357,299 describes a copper-base brazing alloy containing substantial amounts of manganese with small additions of nickel, iron, indium and tin which is suitable for brazing cemented carbide to steel. All of the alloys disclosed therein, have melting temperatures higher than 820° C. No mention is made therein concerning brazing of materials other than SAE 4340 steel-cemented carbide.

Japanese Kokai Patent Publications No. 165590 and No. 165591 describe copper-manganese base alloys used as brazing filler materials at brazing temperature well above 900° C. Those alloys, in addition to copper and manganese, contain at least one of zinc, nickel, iron and cobalt, together with silver, aluminum, indium and rare earth elements. No data concerning mechanical properties of joints brazed with these materials is disclosed therein and the alloys are claimed to have utility in joining cemented carbide tool tips to their steel holders.

Each of the aformentioned patents teaches fabrication of the brazing filler metal by conventional processes which comprise the steps of melting, ingot casting and subsequent multiple stage deformation. The microstructures of these alloys are heterogeneous, resulting in relatively coarse joint microstructure.

There still remains a need in the art of joining ferrous and non-ferrous metals to develop new brazing filler metals that have low melting points, are homogeneous and contain little or no precious metals (e.g. silver) or toxic elements (e.g. cadmium).

SUMMARY AND OBJECTS OF THE INVENTION

The present invention provides a low melting temperature copper based alloy composition adapted for brazing steels, cemented carbides to steels, copper and copper alloys to steels, copper to copper and copper alloys, and composite materials to steels and copper. Generally stated, the composition consists essentially of about 4 to 16 atomic percent manganese, about 4 to 16 atomic percent silicon, about 0 to 16 atomic percent tin, about 0 to 20 atomic percent zinc, about 0 to 10 atomic percent silver and about 0 to 10 atomic percent indium the balance being copper and incidental impurities. Preferably, the alloy has a metastable structure. A metastable structure refers to a state of pseudoequilibrium that has a higher free energy than the true equilibrium state. The pseudoequilibrium structure usually transforms to the equilibrium state by thermally activated processes. In the present case, the asquenched rapidly solidified alloys have a crystal structure of β-bronze which exists at high temperatures in many copper base alloys. The β-bronze structure transforms into the stable structure consisting of a copper base γ-matrix containing manganese silicide precipitates and other minor phases. The major advantage of the metastable state is the compositional homogeneity of this copper matrix with larger amounts of dissolved alloying elements like manganese, silicon, tin, silver, indium and the like. This chemical homogeneity, in turn, imparts uniform melting during brazing and results in a finer microstructure of this brazed joint. A finer microstructure offers superior joint properties.

In addition, the invention provides a homogeneous, ductile brazing foil having a composition consisting essentially of about 4 to 16 atomic percent manganese, about 4 to 16 atomic percent silicon, about 0 to 16 atomic percent tin, about 0 to 20 atomic percent zinc and about 0 to 10 atomic percent silver and about 0 to 10 atomic percent indium the balance being copper and incidental impurities. Preferably, the brazing foil of this invention is at least partially metastable and consists essentially of about 10 to 12 atomic percent manganese, about 10 to 12 atomic percent silicon, about 3 to 5 atomic percent tin, about 4 to 10 atomic percent zinc, about 2 to 5 atomic percent silver, about 1 to 5 atomic percent indium and about 70 to 51 atomic percent copper.

It has been found that the addition of tin, indium and silver to the copper, manganese and silicon admixture markedly decreases melting temperature of alloys. As a result, alloys produced in accordance with the present invention have melting points as low as 640° C.

It has also been found that the addition of tin, indium, silver and zinc enhances wetting and flowability of the alloys on copper and iron base materials.

The homogeneous brazing foil of the invention is fabricated by a process which comprises the steps of forming a melt of the composition and rapidly solidifying the melt on a rotating quench wheel at a rate of at least 10⁵°C./sec.

The filler metal foil is easy to manufacture by this process as homogeneous, ductile ribbon, which is useful for brazing as cast. The metal foil based on the compositions of this invention can be stamped into complex shapes to furnish base preforms. Advantageously, the homogeneous, ductile brazing foil of the invention can be placed inside the joint prior to the brazing operation. The use of the homogeneous, ductile foil provided by this invention also permits production of joints having uniform fine microstructure, thereby achieving good joint mechanical properties. Further, the use of homogeneous, ductile foil in preform shape permits brazing to be accomplished by processes such as dip brazing in molten salts, which are not readily accomplished with powder or rod-type fillers. In addition to foil form, these alloys can also be produced in powder form by grinding the rapidly solidified foil. Powder, produced by rapid solidification, has a similar compositional homogeneity and lower oxide content.

DETAILED DESCRIPTION OF THE INVENTION

The homogeneous metastable alloys of the invention are formed by cooling a melt of the desired composition at a rate of at least $10^5$°C./sec. A variety of rapid quenching techniques, well known to the amorphous metal alloy art, are available for producing homogenized metastable metal powders, wires, ribbons and sheets. Typically, a particular composition is selected, powders or granules of the required elements in the desired proportions are melted and homogenized, and the molten alloy is rapidly quenched on a chilled surface, such as a rapidly rotating cylinder, or in a suitable fluid medium, such as water.

Copper based brazing alloys have been fabricated by processes such as those described above. Following are criteria which the brazing filler metal must satisfy. Melting temperature should to be as low as possible. At the same time, the filler metal must wet and braze base materials well. The filler metal must provide sufficient strength to the joint to meet service requirements of the brazed unit. Essentially, the filler metal composition must contain elements which are compatible with the materials of the brazed parts, that is, there will be no excessive errosion or dissolution of the base materials during brazing, no formation of brittle phases upon solidification and an absence of preferable corrosion in the brazed joint during service. To provide better joint mechnical properties the brazing foil should be homogeneous and should contain no binder or other materials that would otherwise form voids or contaminating residues during brazing. It is also desirable that the brazing material must be in ductile foil form to permit stamping of complex shapes therefrom.

The brazing alloy of this invention consists essentially of about 4–16 atomic percent manganese, about 4 to 16 atomic percent silicon, about 4 to 16 atomic percent tin, about 0 to 20 atomic percent zinc, about 0 to 10 atomic percent silver and about 0 to 10 atomic percent indium the balance being copper and incidental impurities.

Alloys with these compositions are compatible with ferrous and copper base alloys as well as cemented carbides and composite materials containing free graphite.

By homogeneous is meant that the foil, as produced, is of substantially uniform composition in all dimensions. By ductile is meant that foil may be bent to a round radius as small as ten times the foil thickness without fracture.

Examples of brazing alloy compositions within the scope of the invention are given in Table I.

TABLE I

| | | Nominal Composition, Atomic % | | | | | | Solidus °C. | Liquidus °C. |
|---|---|---|---|---|---|---|---|---|---|
| # | Alloy | Cu | Ag | In | Mn | Si | Zn | Sn | | |
| 1 | 1C | 69.8 | — | — | 15.1 | 15.1 | — | — | 754 | 803 |
| 3 | 3C-8 | 59 | — | — | 14.5 | 14.5 | — | 12 | 660 | 700 |
| 7 | 3G | 59 | — | — | 10 | 10 | 10 | 11 | 670 | 720 |
| 8 | 6G | 68 | — | — | 7 | 12 | 5 | 8 | 665 | 720 |
| 2 | 6H | 71 | 5 | — | 12 | 12 | — | — | 678 | 786 |
| 4 | 1H | 60 | — | — | 12 | 12 | — | 16 | 585 | 732 |
| 5 | 10H | 59 | 5 | — | 12 | 12 | — | 12 | 531 | 655 |
| 6 | 9H | 56 | 5 | — | 12 | 12 | 15 | — | 642 | 784 |
| 9 | 20H | 63 | 5 | — | 10 | 10 | — | 12 | 550 | 675 |
| 10 | 2H | 58 | 2 | — | 12 | 12 | 8 | 8 | 626 | 709 |
| 11 | 8G(7H) | 63 | 5 | — | 12 | 12 | 4 | 4 | 625 | 725 |
| 12 | 4H | 58 | 10 | — | 12 | 12 | 4 | 4 | 625 | 725 |
| 14 | 2H | 58 | 2 | — | 12 | 12 | 8 | 8 | 626 | 709 |
| 15 | 8H | 55 | 5 | — | 12 | 12 | 8 | 8 | 625 | 705 |
| 13 | 15H | 55 | 5 | — | 16 | 16 | 4 | 4 | 625 | 701 |
| 14 | H12 | 79 | 5 | — | 4 | 4 | 4 | 4 | ~700 | 918 |
| 15 | 7G | 68 | — | — | 7 | 7 | 10 | 8 | 687 | 755 |
| 16 | H13 | 71 | 5 | — | 8 | 8 | 4 | 4 | 600 | 778 |
| 17 | 8G-14 | 64 | 3 | 1 | 12 | 12 | 4 | 4 | 619 | 747 |
| 18 | 8G-27 | 63 | — | 5 | 12 | 12 | 4 | 4 | 600 | 710 |

Within the broad composition range disclosed above, there is a preferred composition range that is compartible with and permits brazing of steels, copper and copper alloys to steels, copper to copper and copper alloys, and composite materials to steels and copper. Such preferred compositions are exceedingly ductile, have good wettability, produce strong joints and consist essentially of about 10 to 12 atomic percent manganese, about 10 to 12 atomic percent silicon, about 3 to 5 atomic percent tin, about 4 to 10 percent zinc, about 2 to 5 atomic percent silver, about 1 to 5 atomic percent indium and about 51 to 70 atomic percent copper.

Three specially preferred alloys of the present invention have the following compositions: (1) about 5 atomic percent silver, about 12 atomic percent manganese, about 12 atomic percent silicon, about 4 atomic percent zinc, about 4 atomic percent tin, the balance being copper and incidental impurities. (2) about 3 atomic percent silver, about 1 atomic percent indium, about 12 atomic percent manganese, about 12 atomic percent silicon, about 4 atomic percent zinc, about 4 atomic percent tin the balance being copper and incidental impurities; and (3) about 5 atomic percent of indium, about 12 atomic percent manganese, about 12 atomic percent silicon, about 4 atomic percent zinc, about 4 atomic percent tin, the balance being copper and incidental impurities. The brazing foils of this invention are prepared from the melt in the same manner as glassy metal foils. Under these conditions, a metastable, homogeneous, microcrystalline ductile material having a grain size smaller than 0.5 micrometer is obtained.

Foils as produced by the process described above are about 30–200 $\mu$m (0.0012 to 0.008") thick. Foils thicker than 200 $\mu$m (0.008") can also be fabricated by lamination and other compaction techniques.

EXAMPLE I

Ribbons about 5 to 25.5 mm (about 0.1 to 1") wide and about 30 to 200 $\mu$m thick were formed by squirting a melt of the particular composition by over-pressure of argon onto a rapidly rotating copper chill wheel (surface speed about 3000 to 6000 ft/min). Metastable homogeneous alloy ribbons were produced and the compositions of the ribbons are shown in Table I. In Table I are shown the liquidus and solidus temperatures, $T_L$ and $T_S$ of the alloys which were determined by Differential Thermal Analysis (DTA) technique.

EXAMPLE II

Lap shear test specimens were prepared according to the AWS C3.2 "Standard Method for Evaluating the Strength of Brazed Joints". Low carbon 1030SAE steel plates, 3.175 mm (0.125") thick were used as the base metal. Ribbons of the selected compositions (atom fraction) $Cu_{.63}Ag_{.05}Mn_{.12}Si_{.12}Zn_{.04}Sn_{.04}$, $Cu_{.64}Ag_{.03}In_{.01}Mn_{.12}Si_{.12}Zn_{.04}Sn_{.04}$, $Cu_{.63}Ag_{.05}Mn_{.12}Si_{.12}Zn_{.04}Sn_{.04}$ having dimensions of about 100 $\mu$m (0.004") thick and about 12.5 mm (0.5") wide were used as the filler metals. Plates of the base metal and filler ribbons were degreased and rinsed according to conventional procedures. The mating surfaces of the plates and brazing ribbons were coated by a standard flux produced by Handy and Harman. Lap joints, with the overlap dimension of about 6.25 mm (0.25), containing the selected brazing ribbons of the invention were then assembled in a special way with ribbons covering the entire area of the overlap. Specimens were then clamped and torch brazed using oxyacetylene flame. Similar samples were also induction brazed. Brazed samples were then air cooled to room temperature and the flux residue was removed by boiling samples in water. Afterward the tensile samples were milled out of brazed plates.

For comparative purposes identical joints were produced under identical conditions using standard 75 $\mu$m (0.005 $\mu$m) BAg-1 ribbon. The nominal composition (atomic percent) of BAg-1 alloy according certificate of its producer, Handy and Harman Co. is Ag-37.53, Cu-21.24, Zn-22.02 and Cd-19.21. Afterwards the mechanical tests were done on both types of brazed samples. Mechanical properties of brazed joints are shown in Table II.

TABLE II

Shear strength of torch flux brazed joints comprised of 1030 SAE low carbon steel plates. (Standard AWS C3.2 test procedure.)

| Filler Alloy | Filler Alloy Composition (atom %) | Shear Strength MPa (psi) |
| --- | --- | --- |
| 8G | $Cu_{63}Ag_5Mn_{12}Si_{12}Zn_4Sn_4$ | 124 (17,980) |
| 8G-2 | $Cu_{65}Ag_3Mn_{12}Si_{12}Zn_4Sn_4$ | 115 (16,675) |
| 8G-14 | $Cu_{64}Ag_3In_1Mn_{12}Si_{12}Zn_4Sn_4$ | 121 (17,545) |
| BAg-1 | $Cu_{21.6}Ag_{37.8}Zn_{21.6}Cd_{18.9}$ | 135 (19,975) |

EXAMPLE III

Shear test samples were prepared by brazing a low carbon 1010SAE steel plate with a high friction material. This high friction material, comprised of (wt. %) about 15 percent graphite, about 20 percent copper, about 5 percent tin, the balance being iron, is made by means of powder metallurgy and is used as pads for heavy duty truck brakes. Plates of the base metal, filler ribbons and pads were degreased and rinsed according to conventional procedures. The mating surfaces of the plates, brazing ribbon were coated by standard B-1 or H.F. fluxes produced by Handy and Harman. A pad having a 3×2 inches mating surface was positioned on a larger plate with brazing ribbon covering the entire area of contact Samples were then brazed using induction heating provided by a flat inductor. Three materials, namely 8G-14 ($Cu_{.64}Ag_{.03}In_{.01}Mn_{.12}Si_{.12}Zn_{.04}Sn_{.04}$) 8G ($Cu_{.63}Ag_{.05}Mn_{.12}Si_{.12}Zn_{.04}Sn_{.04}$) and 8G-2 ($Cu_{.65}Ag_{.03}Mn_{.12}Si_{.12}Zn_{.04}Sn_{.04}$) were used as brazing filler metals in the cast ribbon shape of about 1.5 mils (37 $\mu$m) thickness. Two ribbons were preplaced in the brazing gap forming about 3 mils filler. For comparative purposes identical joints were produced under identical conditions using standard 125 $\mu$m (5 mils) Easy Flo 45 brazing filler alloy which contains 45 wt. % of silver, only one ribbon was preplaced in the brazing gap. After brazing, the brazements were cleaned up and the shear strength of joints was determined.

Table III shows peak load before joint fracture and the place when the failure occured.

TABLE III

Peak load before fracture of induction flux brazed joints comprised of 1010 SAE steel base and P/M pad.

| Filler Alloy | Filler Alloy Composition (at. %) | Peak load, lbs. | Failure location |
| --- | --- | --- | --- |
| 8G-14 | $Cu_{64}Ag_3In_1Mn_{12}Si_{12}Zn_4Sn_4$ | 12,000 | Friction material |
| 8G | $Cu_{63}Ag_5Mn_{12}Si_{12}Zn_4Sn_4$ | 11,000 | Friction material |
| 8G-2 | $Cu_{65}Ag_3Mn_{12}Si_{12}Zn_4Sn_4$ | 9,600 | Friction material |
| Easy Flo 45 | $Cu_{21.6}Ag_{37.8}Zn_{21.6}Cd_{18.9}$ | 8,200 | Friction material |

EXAMPLE IV

Lap shear test specimens were prepared according to the AWS C3.2 "Standard Method for Evaluating the Strength of Brazed Joints". Low carbon 1030 SAE steel and tough pitch copper plates, 3.175mm (0.125") thick were used as metals subjected to brazing. Ribbons of the selected compositions (atom fraction) $Cu_{.65}Ag_{.03}Mn_{.12}Si_{.12}Zn_{.04}Sn_{.04}$ (#8G-2), $Cu_{.64}Ag_{.03}In_{.01}Mn_{.12}Si_{.12}Zn_{.04}Sn_{.04}$ (#8G-14) and $Cu_{.65}Ag_{.05}Mn_{.12}Si_{.12}Zn_{.04}Sn_{.04}$ (#8G) having dimensions about 75 $\mu$m (3 mils) thick and about 12.5mm (0.5") wide were used as the filler metals. Plates of the base metals and filler ribbons were degreased and rinsed according to conventional procedures. The mating surfaces of the plates and brazing ribbons of the invention were then assembled in a special way with ribbons covering the entire area of the overlap. Specimens were then clamped and torch brazed using oxyacetylene flame. Brazed samples were then air cooled to room temperature and the flux residue was removed by boiling samples in water. Afterwards the tensile samples were milled out of brazed plates.

For comparative purposes identical joints were produced under identical conditions using standard 75 μm (3 mils) BAg-1 ribbons. The nominal compositions (atomic percent) of BAg-1 alloy according to certificate of its producer, Handy and Harman Co. is Ag-37.53, Cu-21.24, Zn-22.02 and Cd-19.01. Mechanical properties of brazed joints are shown in Table IV.

TABLE IV

Shear strength of torch flux brazed joints comprised of 1030 SAE/copper plates. (Standard AWS C3.2 test procedure.)

| Filler Alloy | Filler Alloy Composition (at. %) | Shear Strength MPa (psi) |
|---|---|---|
| 8G | $Cu_{63}Ag_5Mn_{12}Si_{12}Zn_4Sn_4$ | 98 (14,210) |
| 8G-2 | $Cu_{65}Ag_3Mn_{12}Si_{12}Zn_4Sn_4$ | 88 (12,760) |
| 8G-14 | $Cu_{64}Ag_3In_1Mn_{12}Si_{12}Zn_4Sn_4$ | 92 (13,340) |
| BAg-1 | $Cu_{21.6}Ag_{37.8}Zn_{21.6}Cd_{18.9}$ | 106 (15,370) |

Having thus described the invention in rather full detail it will be understood that this detail need not be strictly adhered to but that various changes and modifications may suggest themselves to one skilled in the art, all falling within the scope of the invention as defined by the subjoined claims.

What is claimed:

1. A homogeneous, ductile metal alloy having a metastable structure and a composition consisting essentially of about 4 to 16 atom percent manganese, about 4 to 16 atom percent silicon, about 0 to 16 atom percent tin, about 0 to 20 atom percent zinc, about 0 to 10 atom percent silver and about 0 to 10 atom percent indium, the balance being copper and incidental impurities.

2. A metal alloy composition as recited in claim 1, wherein said composition is in the form of a foil.

3. A metal alloy composition as recited in claim 1, wherein said composition is in the form of a powder.

4. A metal alloy composition as recited in claim 1, having a composition consisting essentially of about 10 to 12 atom percent manganese, about 10 to 12 atom percent silicon, about 3 to 5 atom percent tin, about 4 to 10 atom percent zinc, about 2 to 5 atom percent silver, about 1 to 5 atom percent indium and about 51 to 70 atom percent copper.

5. A metal alloy as recited in claim 1, having a composition consisting essentially of about 12 atom percent manganese, about 12 atom percent silicon, about 4 atom percent tin, about 4 atom percent zinc, about 5 atom percent silver and about 63 atom percent copper.

6. A metal alloy as recited in claim 1, having a composition consisting essentially of about 12 atom percent manganese, about 12 atom percent silicon, about 4 atom percent tin, about 4 atom percent zinc, about 3 atom percent silver, about 1 atom percent indium and about 64 atom percent copper.

7. A metal alloy as recited in claim 1, having a composition consisting essentially of about 12 atom percent manganese, about 12 atom percent silicon, about 4 percent tin, about 4 percent zinc, about 5 atom percent indium and about 63 atom percent copper.

8. A homogeneous ductile brazing foil having a metastable structure and a composition consisting essentially of about 4 to 16 atom percent manganese, about 4 to 16 atom percent silicon, about 0 to 16 atom percent tin, about 0 to 20 atom percent zinc, about 0 to 10 atom percent silver and about 0 to 10 atom percent indium, the balance being copper and incidental impurities.

9. A brazing foil as recited in claim 8, wherein said foil has a composition consisting essentially of about 10 to 12 atom percent manganese, about 10 to 12 atom percent silicon, about 3 to 5 atom percent tin, about 4 to 10 atom percent zinc, about 2 to 5 atom percent silver, about 1 to 5 atom percent indium and about 51 to 70 atom percent copper.

10. A brazing foil as recited in claim 8, having a composition consisting essentially of about 12 atom percent manganese, about 12 atom percent silicon, about 4 atom percent tin, about 4 atom percent zinc, about 5 atom percent silver and about 63 atom percent copper.

11. A brazing foil as recited in claim 8, having a composition consisting essentially of about 12 atom percent manganese, about 12 atom percent silicon, about 4 atom percent tin, about 4 atom percent zinc, about 3 atom percent silver, about 1 atom percent indium and about 64 atom percent copper.

12. A brazing foil as recited in claim 8, having a composition consisting essentially of about 12 atom percent manganese, about 12 percent silicon, about 4 percent tin, about 4 percent zinc, about 5 atom percent indium and about 63 atom percent copper.

13. A process for fabricating homogeneous, ductile foil having a metastable structure and a composition consisting essentially of about 4 to 16 atom percent manganese, about 4 to 16 atom percent silicon, about 0 to 16 atom percent tin, about 0 to 20 atom percent zinc, about 0 to 10 atom percent silver and about 0 to 10 atom percent indium, the balance being copper and incidental impurities, which process comprises forming a melt of the composition and quenching the melt on a rotating chill block at a rate of at least about $10^5$°C./sec.

14. The process of claim 12 in which the foil has a composition consisting essentially of about 10 to 12 atom percent manganese, about 10 to 12 atom percent silicon, about 3 to 5 atom percent tin, about 4 to 10 atom percent zinc, about 2 to 5 atom percent silver, about 1 to 5 atom percent indium and about 51 to 70 atom percent copper.

15. A product produced by the process of claim 13.

16. The process of claim 13 in which the foil has a composition consisting essentially of about 12 atom percent manganese, about 12 atom percent silicon, about 4 atom percent tin, about 4 atom percent zinc, about 3 atom percent silver, about 1 atom percent indium and about 64 atom percent copper.

17. A process for joining together two or more metal parts which comprises:
(a) interposing a filler metal between the metal parts to form an assembly, the filler metal having a melting point less than that of any of the parts;
(b) heating the assembly to at least the melting temperature of the filler metal; and
(c) cooling the assembly; wherein the improvement comprises employing, as the filler metal, a homogeneous, ductile copper based foil having a metastable structure and a composition consisting essentially of about 4 to 16 atom percent manganese, about 4 to 16 atom percent silicon, about 0 to 16 atom percent tin, about 0 to 20 atom percent zinc, about 0 to 10 atom percent.

18. The process of claim 17 in which the filler metal foil has a composition consisting essentially of about 10 to 12 atom percent manganese, about 10 to 12 atom percent silicon, about 3 to 5 atom percent tin, about 4 to 10 atom percent zinc, about 2 to 5 atom percent silver, about 1 to 5 atom percent indium and about 51 to 70 atom percent copper.

19. The process of claim 18 in which the filler metal foil has a composition consisting essentially of about 12 atom percent manganese, about 12 atom percent silicon, about 4 atom percent tin, about 4 atom percent zinc, about 5 atom percent silver and about 63 atom percent copper.

20. The process of claim 18 in which the filler metal foil has a composition consisting essentially of about 12 atom percent manganese, about 12 atom percent silicon, about 4 atom percent tin, about 4 atom percent zinc, about 3 atom percent silver, about 1 atom percent indium and about 64 atom percent copper.

21. The process of claim 18 in which the filler metal foil has a composition consisting essentially of about 12 atom percent manganese, about 12 atom percent silicon, about 4 atom percent tin, about 4 atom percent zinc, about 5 atom percent indium and about 63 atom percent copper.

* * * * *